(12) United States Patent
Chen

(10) Patent No.: US 9,062,770 B2
(45) Date of Patent: Jun. 23, 2015

(54) SEALING DEVICE FOR A COLLET CHUCK

(71) Applicant: Chin-Chiu Chen, Taichung (TW)

(72) Inventor: Chin-Chiu Chen, Taichung (TW)

( * ) Notice: Subject to any disclaimer, the term of this patent is extended or adjusted under 35 U.S.C. 154(b) by 224 days.

(21) Appl. No.: 13/862,180

(22) Filed: Apr. 12, 2013

(65) Prior Publication Data

US 2014/0306408 A1    Oct. 16, 2014

(51) Int. Cl.
*F16J 15/02* (2006.01)
*B23B 31/02* (2006.01)
*B23B 31/20* (2006.01)

(52) U.S. Cl.
CPC ............... *F16J 15/021* (2013.01); *B23B 31/02* (2013.01); *B23B 31/201* (2013.01); *B23B 2250/12* (2013.01); *B23B 2260/106* (2013.01); *B23B 2260/126* (2013.01)

(58) Field of Classification Search
USPC .......................................... 277/500, 579, 584
See application file for complete search history.

(56) References Cited

U.S. PATENT DOCUMENTS

| 3,080,170 | A | * | 3/1963 | Colby | 277/390 |
| 4,166,606 | A | * | 9/1979 | Kawolics et al. | 251/214 |
| 4,557,870 | A | * | 12/1985 | Rodgers et al. | 554/224 |
| 4,703,937 | A | * | 11/1987 | Chrzanowski | 277/584 |
| 5,567,093 | A | * | 10/1996 | Richmond | 409/136 |
| 6,601,857 | B1 | * | 8/2003 | Richmond | 279/20 |
| 7,140,616 | B1 | | 11/2006 | Gerber | |
| 2006/0197291 | A1 | * | 9/2006 | Oshnock et al. | 279/20 |
| 2011/0186317 | A1 | * | 8/2011 | Eisenhardt et al. | 173/48 |

FOREIGN PATENT DOCUMENTS

| DE | 9207833 U1 | 9/1992 |
| DE | 19832793 A1 * | 3/1999 |

* cited by examiner

*Primary Examiner* — Vishal Patel
(74) *Attorney, Agent, or Firm* — Shimokaji & Associates, P.C.

(57) ABSTRACT

A sealing device for a collet chuck has a tensioning nut, a sealing washer, a main sealing ring and a pressure space. The sealing washer is mounted in the tensioning nut and has a main ring groove, an abutting surface, a liquid-inlet surface, and a liquid inlet. The liquid inlet is formed between an imaginary surface extending from the abutting surface and the liquid-inlet surface. The main sealing ring is mounted and positioned in the main ring groove. The main sealing ring protrudes out of and abuts the main ring groove. The pressure space is formed between a rear side of the main sealing ring and the main ring groove. Therefore, a coolant poured into the sealing device can pressure the main sealing ring to deform the main sealing ring, such that the main sealing ring can tightly abut a tool shank.

1 Claim, 6 Drawing Sheets

SEALING DEVICE FOR A COLLET CHUCK

BACKGROUND OF THE INVENTION

1. Field of the Invention

The present invention relates to a sealing device, and more particularly to a sealing device for a collet chuck.

2. Description of Related Art

A tensioning nut is applied for fixing a collet chuck on a collet chuck housing. In use, the collet chuck is inserted into the collet chuck housing, and a tool shank is inserted into the collet chuck. The tensioning nut is mounted around the collet chuck housing and the collet chuck. When the tool shank is operated at high speed, such as for cutting or grinding an object, a temperature of the tool shank gets high. In the meantime, a coolant has to be poured from a back end of the collet chuck into the tensioning nut and the tool shank to cool down the tool shank to keep the temperature of the tool shank from getting too high.

With reference to U.S. Pat. No. 7,140,616 B1 and Germany Patent Number G 92 07 833.8, a conventional sealing device for the collet chuck comprises a tensioning nut, a sealing washer, and a sealing ring. The tensioning nut comprises a nut space. A front end of the nut space is formed as a stepped structure. The sealing washer is mounted in the nut space and corresponds to the stepped structure. A minor ring is mounted between the sealing washer and the tensioning nut. The sealing washer comprises a tool shank hole and a ring groove. The tool shank hole is formed through the sealing washer. The ring groove is formed concaved in the sealing washer. The sealing ring is mounted in the ring groove.

When the tensioning nut is mounted around the collet chuck and the collet chuck housing, the sealing ring abuts the tool shank to achieve a leak-proof effect for the coolant. The sealing ring abuts the tool shank by a pressure from the coolant from all directions, such that the coolant is kept from leaking out of the tensioning nut. However, the sealing ring is not positioned in the ring groove, which may lead to leak of the coolant.

When the amount of the coolant poured into the collet chuck and the tool shank is insufficient, the pressure of the coolant may be insufficient to press the sealing ring. The concussion caused by the tool shank in operation may displace the sealing ring from the surface of the tool shank. When the sealing ring is displaced from the tool shank, the coolant flows between the tool shank and the sealing ring, and then flows out of the tensioning nut. Therefore, the amount of the coolant poured into the tool shank will be decreased again, and the cooling effect for the tool shank will be degraded.

On the other hand, when the amount of the coolant poured into the collet chuck and the tool shank is sufficient, the pressure of the coolant is adequate to press the sealing ring on the surface of the tool shank. Nevertheless, when the coolant flows into the ring groove, the impact from the coolant may displace the sealing ring relative to the tool shank since the sealing ring is not positioned in the ring groove. When the sealing ring is displaced, the coolant may flow between the sealing ring and the tool shank, and then flow out of the tensioning nut. Therefore, the amount of the coolant that should have been poured into the tool shank to cool down the tool shank is decreased, so the cooling effect for the tool shank is degraded.

In particular, after prolonged use of the sealing device, the elasticity of the sealing ring is degraded, and the leakage as described above occurs more frequently.

SUMMARY OF THE INVENTION

The main object of the present invention is to provide a sealing device for a collet chuck having enhanced leak-proof effect; the sealing device comprises a tensioning nut, a sealing washer, a main sealing ring, and a pressure space.

The tensioning nut comprises a front end, a rear end, and a nut space. The nut space is formed through the tensioning nut from the front end to the rear end and comprises a stepped structure formed in the front end of the tensioning nut.

The sealing washer is annular, is mounted in the stepped structure and comprises a tool shank hole formed through the sealing washer and having a hole diameter, a front section located in the sealing washer, a rear section located in the sealing washer, a middle section located in the sealing washer and connected between the front section and the rear section of the sealing washer, a main ring groove annularly concaved in the sealing washer and located at the middle section, an abutting surface formed on the front section of the sealing washer, an imaginary surface extending from the abutting surface, a liquid-inlet surface formed on the rear section of the sealing washer, formed opposite to the tensioning nut, and formed closer to the rear end of the tensioning nut than the abutting surface, and a liquid inlet formed between the liquid-inlet surface and the imaginary surface and having a depth less than a half of the groove depth.

The main ring groove comprises a positioning surface, a groove depth, and a groove width. The groove width is larger than the groove depth. The groove depth is defined between the abutting surface and the positioning surface. The liquid-inlet surface comprises a front section and a rear section closer to the rear end of the tensioning nut than the front section of the liquid-inlet surface. The hole diameter of the tool shank hole is smaller at the abutting surface than at the liquid-inlet surface.

The main sealing ring is elastic, is mounted and positioned in the main ring groove and comprises a cross sectional diameter being larger than the groove depth and narrower than the groove width, an outer side abutting the positioning surface of the main ring groove, an inner side protruding out of the main ring groove, and a rear side. The pressure space is formed between the rear side of the main sealing ring and the sealing washer.

The cross sectional diameter is larger than the groove depth, such that the main sealing ring protrudes out of the main ring groove and abuts the positioning surface of the main ring groove. The main sealing ring abuts the positioning surface to be further positioned in the main ring groove. The cross sectional diameter is narrower than the width of the main ring groove, such that the pressure space is formed between the rear side of the main sealing ring and the main ring groove.

When a coolant is poured into the tensioning nut, the coolant fills the pressure space to press the main sealing ring via the pressure of the coolant. The main sealing ring abuts the main ring groove, such that the coolant cannot flow between the positioning surface and the main sealing ring. When the pressure of the coolant gets higher, the main sealing ring presses a tool shank more tightly. Therefore, the sealing device can provide an enhanced leak proof effect.

DETAILED DESCRIPTION OF PREFERRED EMBODIMENT

Figure 1:
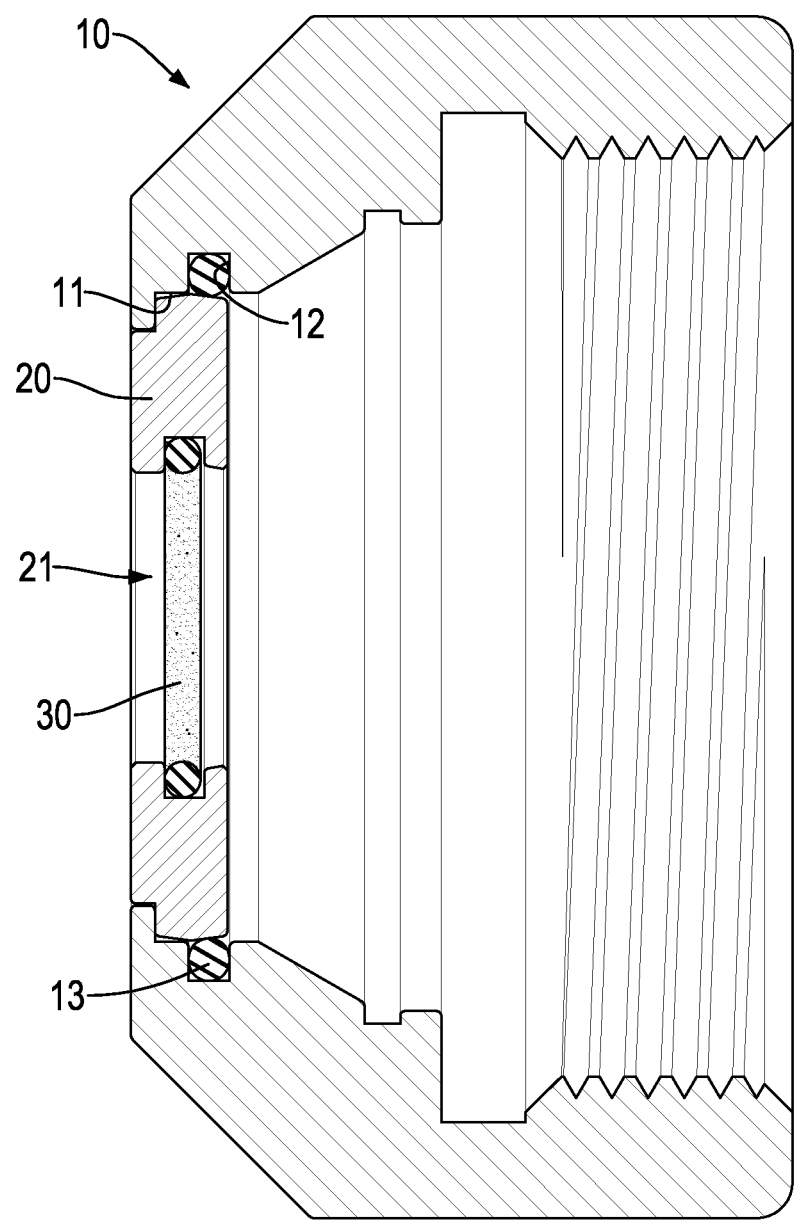
FIG. 1 is a cross sectional side view of a first preferred embodiment of a sealing device for a collet chuck in accordance with the present invention.
Figure 2:
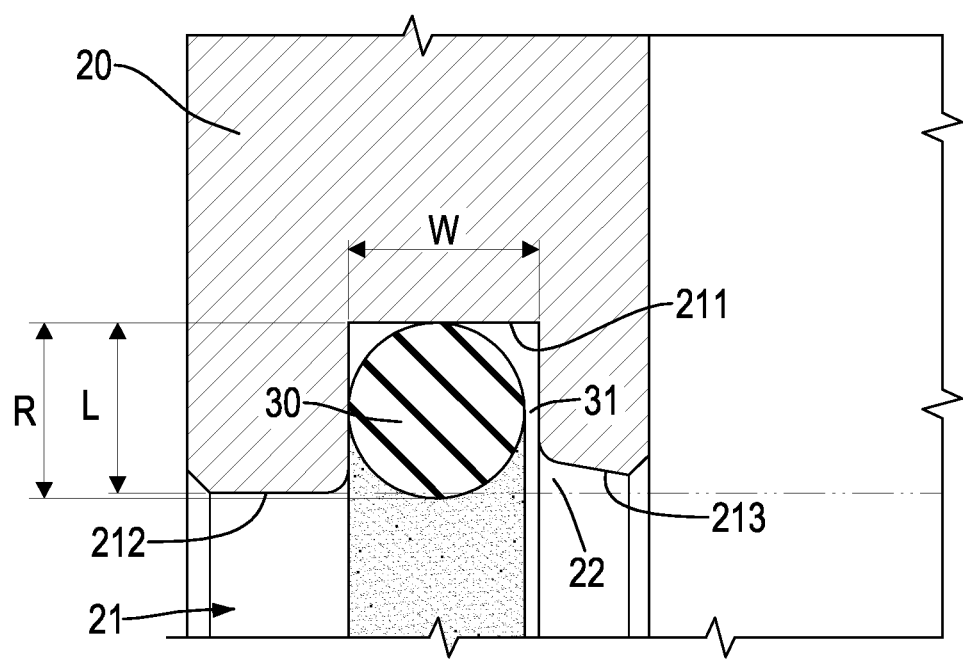
FIG. 2 is an enlarged cross sectional side view of the sealing device in FIG. 1.

With reference to FIG. 1 and FIG. 2, a first preferred embodiment of a sealing device for a collet chuck in accordance with the present invention comprises a tensioning nut 10, a sealing washer 20, and a main sealing ring 30.

The tensioning nut 10 comprises a front end, a rear end, a nut space 11 and a minor ring groove 12. The tensioning nut 10 is combined with a collet chuck housing by threads on the rear end of the tensioning nut 10. The nut space 11 is formed through the tensioning nut 10 from the front end to the rear end and comprises a stepped structure 111 in the front end of the tensioning nut 10. The stepped structure 111 has a front section and a rear section. The inner diameter of the front section of the stepped structure 111 is smaller than the inner diameter of the rear section of the stepped structure 111. The minor ring groove 12 is annularly concaved in the rear section of the stepped structure 111. A minor sealing ring 13 is mounted in the minor ring groove 12.

The sealing washer 20 is annular, is mounted in the stepped structure 111 and comprises a tool shank hole 21, a front section, a middle section, a rear section, a main ring groove 211, an abutting surface 212, a liquid-inlet surface 213 and a liquid inlet 22. The tool shank hole 21 is formed through the sealing washer 20 and has a hole diameter. The front section, the middle section, and the rear section are located in the sealing washer 20 in sequence, wherein the rear section is closer to the rear end of the tensioning nut 10 than the middle section and the front section. The main ring groove 211 is annularly concaved in the sealing washer 20 and located at the middle section of the sealing washer 20 and opposite to the tensioning nut 10. The main ring groove 211 has a positioning surface, a groove depth L and a groove width W, wherein the positioning surface is located at a bottom of the main ring groove 211 and the groove width W is larger than the groove depth L.

The abutting surface 212 and the liquid-inlet surface 213 are respectively formed on the front section and the rear section of the sealing washer 20 and formed opposite to the tensioning nut 10, wherein the groove depth L is defined between the abutting surface 212 and the positioning surface of the main ring groove 211. The hole diameter of the tool shank hole 21 is smaller at the abutting surface 212 than at the liquid-inlet surface 213. The liquid-inlet surface 213 has a front section and a rear section, wherein the front section is adjacent to the main ring groove 211. The liquid-inlet surface 213 is inclined with respect to the positioning surface of the main ring groove 211.

The liquid inlet 22 is formed between the liquid-inlet surface 213 and an imaginary surface that extends from the abutting surface 212. The liquid inlet 22 has a front section that is defined with respect to the front section of the liquid-inlet surface 213 and a rear section that is defined with respect to the rear section of the liquid-inlet surface 213. The depth of the front section of the liquid inlet 22 is deeper than the depth of the rear section of the liquid inlet 22. Either the depth of the front section of the liquid inlet 22 or the depth of the rear section of the liquid inlet 22 is smaller than a half of the groove depth L.

The main sealing ring 30 is elastic, is mounted and positioned in the main ring groove 211 and has a cross sectional diameter R, an outer side, an inner side and a rear side. The cross sectional diameter R of the main sealing ring 30 is larger than the groove depth L but is narrower than the groove width W. Therefore, when the main sealing ring 30 is mounted in the main ring groove 211, the outer side of the main sealing ring 30 abuts the positioning surface of the main ring groove 211 to position the main sealing ring 30 in the main ring groove 211 and the inner side of the main sealing ring 30 protrudes out of the main ring groove 211 since the cross sectional diameter R is larger than the groove depth L. A pressure space 31 is formed between the rear side of the main sealing ring 30 and the sealing washer 20 since the cross sectional diameter R is narrower than the groove width W.

Figure 3:
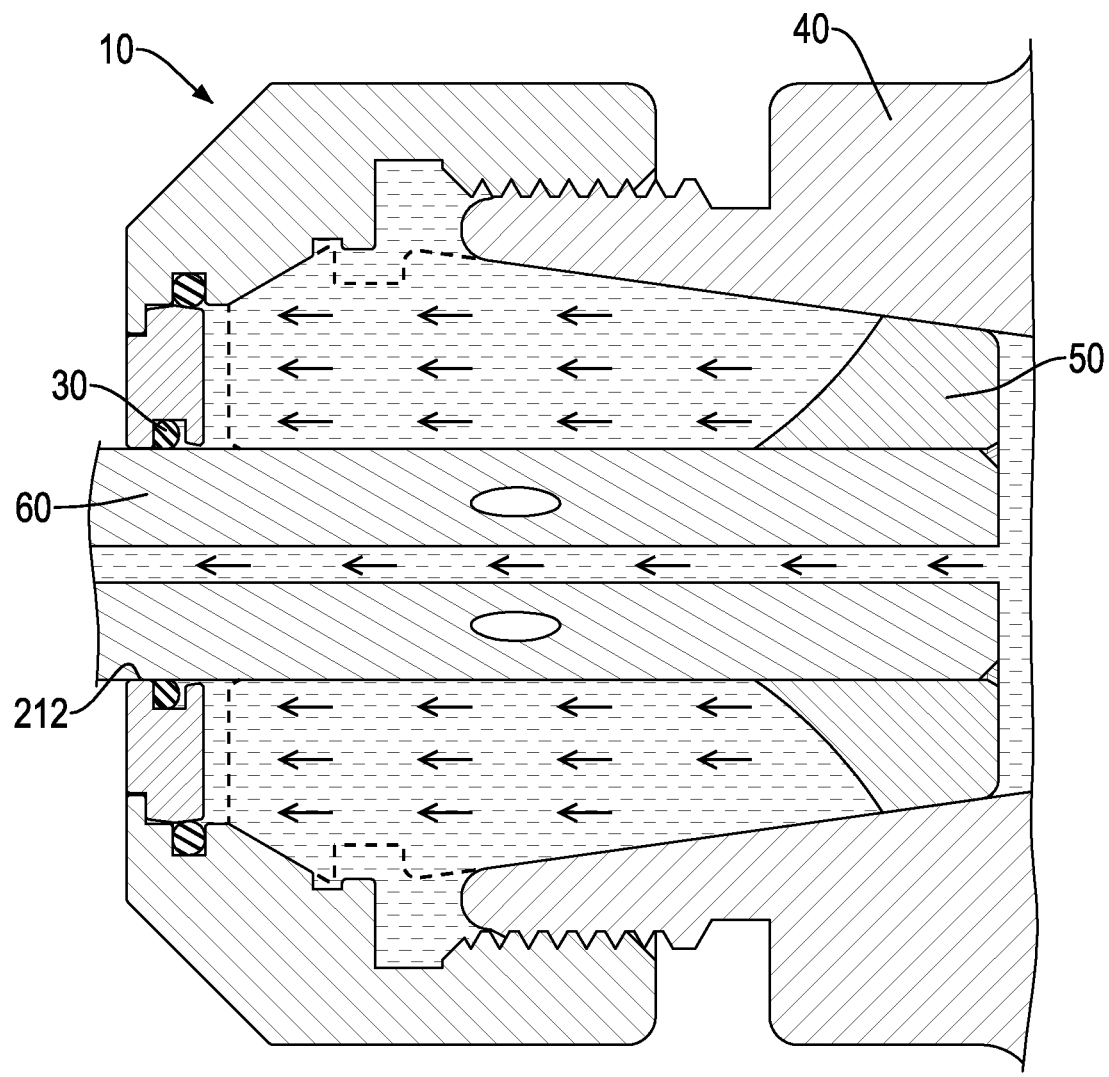
FIG. 3 is an operational cross sectional side view of the sealing device in FIG. 1.

With reference to FIG. 2 and FIG. 3, in use, the tensioning nut 10 is mounted around a front end of a collet chuck housing 40 and a collet chuck 50 that is inserted into the collet chuck housing 40, such that the tensioning nut 10 holds the collet chuck 50 within the collet chuck housing 40. A tool shank 60 is inserted into the collet chuck 50. The outer diameter of the tool shank 60 matches the hole diameter of the tool shank hole 21 at the position of the abutting surface 212. The inner side of the main sealing ring 30 abuts the tool shank 60.

Figure 4:
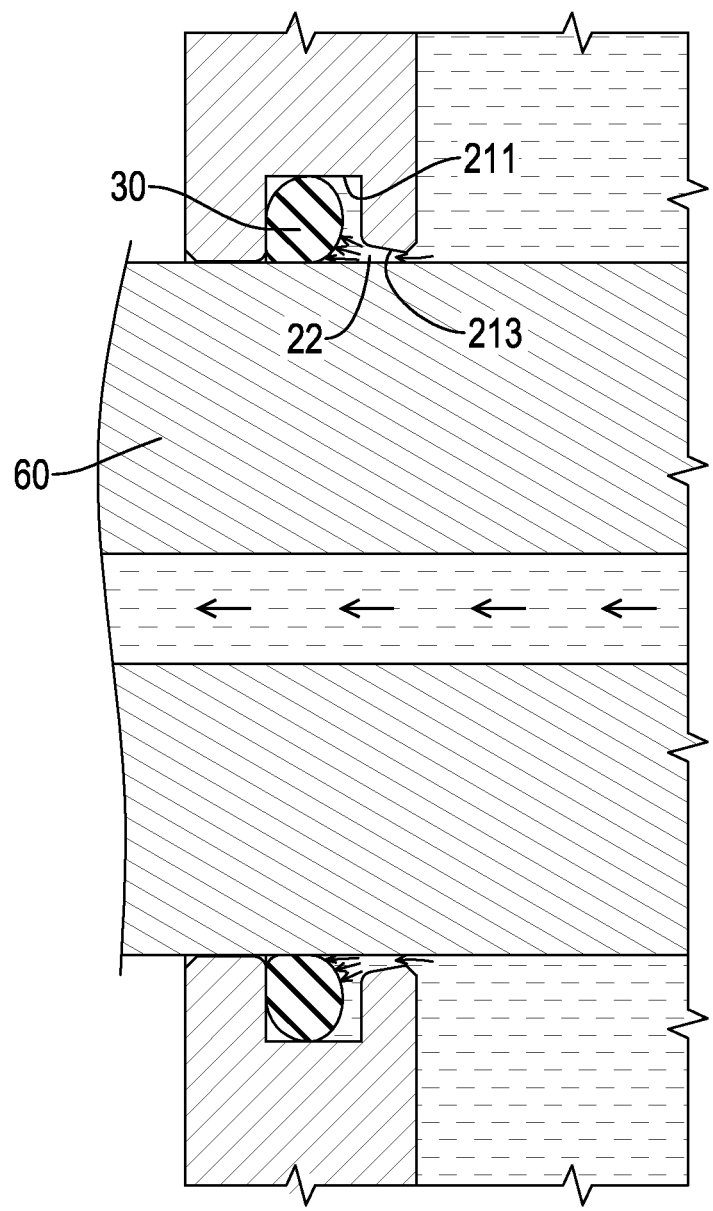
FIG. 4 is a partially enlarged cross sectional side view of FIG. 3.
Figure 5:
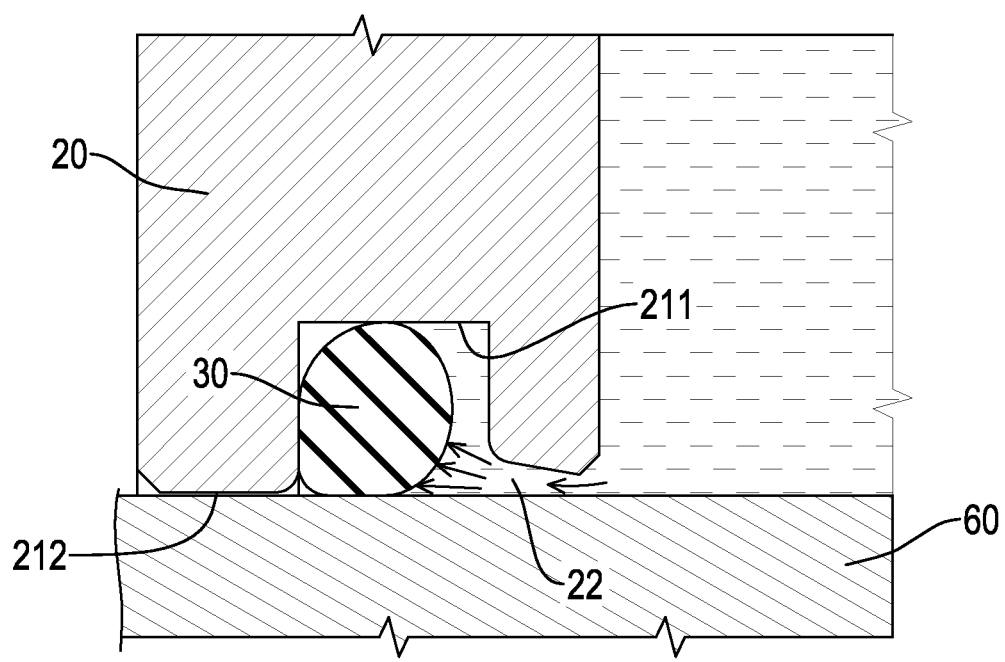
FIG. 5 is another partially enlarged cross sectional side view of FIG. 3.

With reference to FIG. 3 to FIG. 5, when the tool shank 60 is operated at high speed, the temperature of the tool shank 60 increases. A coolant is poured into the tool shank 60 and the collet chuck 50 to cool down the tool shank 60. The outer side of the main sealing ring 30 abuts the positioning surface of the main ring groove 211 to restrict the position of the main sealing ring 30 in the main ring groove 211. The main sealing ring 30 can hardly be displaced from the tool shank 60 due to the concussion caused by the tool shank 60 at high speed operation since the position of the main sealing ring 30 in the main ring groove 211 is restricted. Therefore, the coolant is enclosed in the pressure space 31 and flows in the tool shank 60 instead of flowing out of the tensioning nut 10, thereby maintaining sufficient cooling effect for the tool shank 60.

On the other hand, when the coolant enters into the pressure space 31 through the liquid inlet 22, the coolant first impacts the junction of the rear side and the inner side of the main sealing ring 30 since the depth of the liquid inlet 22 is less than the half of the groove depth L. The pressure of the coolant makes the main sealing ring 30 deformed towards the front end of the tensioning nut 10 and accurately abut the tool shank 60 instead of being displaced from the tool shank 60 because the position of the main sealing ring 30 in the main ring groove 211 is restricted. When the pressure of the coolant gets higher, the sealing effect of the main sealing ring 30 becomes better. Therefore, the coolant is surely to be held in the pressure space 31 and the tool shank 60 to maintain sufficient cooling effect for the tool shank 60.

Figure 6:
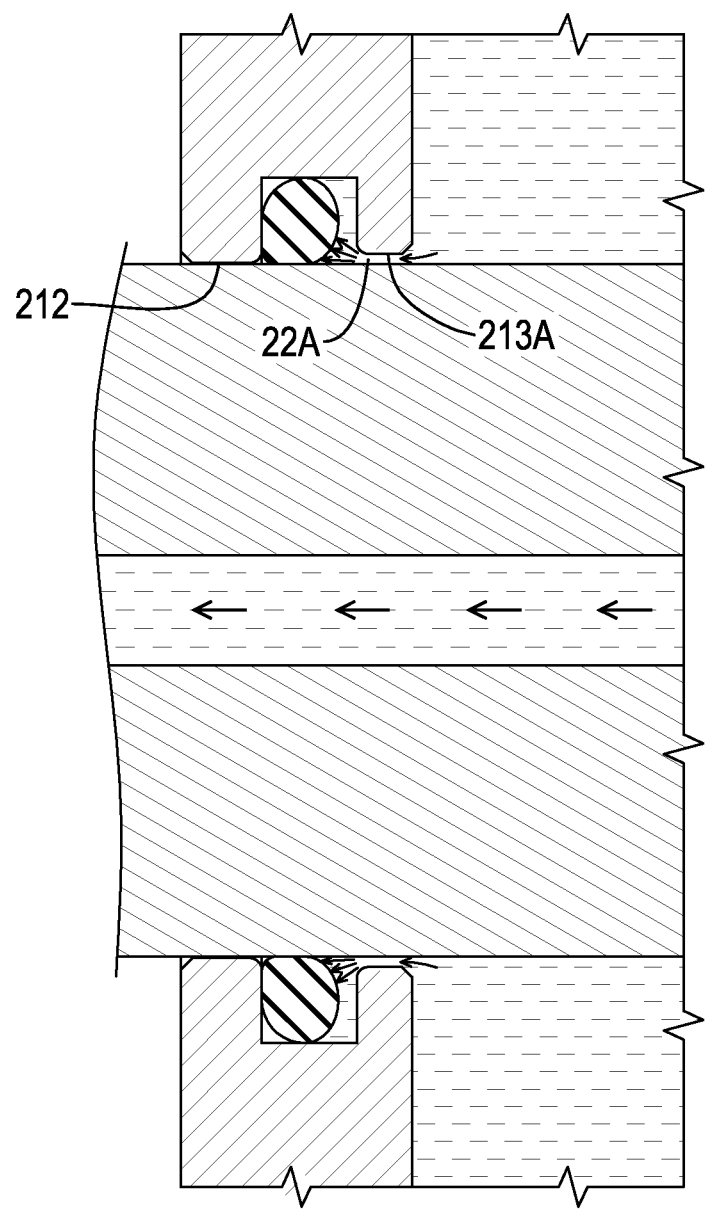
FIG. 6 is an enlarged cross sectional side view of a second preferred embodiment of a sealing device in accordance with the present invention.

With reference to FIG. 6, in a second preferred embodiment of the sealing device for a collet chuck, the liquid-inlet surface 213A is formed parallel with the imaginary surface that extends from the abutting surface 212. The depth of the front section of the liquid inlet 22A is equal to the depth of the rear section of the liquid inlet 22A.

What is claimed is:

1. A sealing device comprising:
  a tensioning nut comprising
    a front end;
    a rear end; and a nut space formed through the tensioning nut from the front end to the rear end and comprising a stepped structure formed in the front end of the tensioning nut;

a sealing washer being annular, formed as a single part, mounted in the stepped structure, and comprising
- a tool shank hole formed through the sealing washer and having a hole diameter;
- a front section located in the sealing washer;
- a rear section located in the sealing washer;
- a middle section located in the sealing washer and connected between the front section and the rear section of the sealing washer;
- a main ring groove annularly concaved in the sealing washer, located at the middle section, wherein the main ring groove is defined by two walls perpendicular to a positioning surface, and comprising
  - a positioning surface parallel to the tool shank hole;
  - a groove depth; and
  - a groove width larger than the groove depth;
- an abutting surface formed on the front section of the sealing washer and opposite to the tensioning nut, wherein the groove depth is defined between the abutting surface and the positioning surface;
- an imaginary surface extending from the abutting surface;
- a liquid-inlet surface formed on the rear section of the sealing washer, formed opposite to the tensioning nut, formed closer to the rear end of the tensioning nut than the abutting surface, and having
  - a front section; and
  - a rear section closer to the rear end of the tensioning nut than the front section of the liquid-inlet surface;
  - wherein the hole diameter of the tool shank hole is smaller at the abutting surface than at the liquid-inlet surface;
- a liquid inlet formed between the liquid-inlet surface and the imaginary surface and having a depth less than a half of the groove depth;

a main sealing ring being elastic, mounted and positioned in the main ring groove and comprising
- a cross sectional diameter being larger than the groove depth and narrower than the groove width;
- an outer side abutting the positioning surface of the main ring groove;
- an inner side protruding out of the main ring groove; and
- a rear side; and a pressure space formed between the rear side of the main sealing ring and the sealing washer, wherein the tensioning nut further has a minor ring groove annularly concaved in the stepped structure; and a minor sealing ring is mounted in the minor ring groove and abuts the sealing washer, wherein the liquid-inlet surface is inclined radially outwardly with respect to the positioning surface of the main ring groove, and wherein the hole diameter of the tool shank hole is smaller at the rear section of the liquid-inlet surface than at the front section of the liquid-inlet surface.

* * * * *